United States Patent [19]

Rigler et al.

[11] 4,255,525

[45] Mar. 10, 1981

[54] SMALL PARTICULATE EXPANDABLE STYRENE POLYMER MOLDING COMPOSITIONS

[75] Inventors: Josef K. Rigler; Wolfgang Schäfer; Horst Leithäuser; Karl Trukenbrod, all of Marl; Werner Bollmann, Haltern, all of Fed. Rep. of Germany

[73] Assignee: Chemische Werhe Hüls AG, Marl, Fed. Rep. of Germany

[21] Appl. No.: 70,815

[22] Filed: Aug. 29, 1979

[30] Foreign Application Priority Data

Sep. 13, 1978 [DE] Fed. Rep. of Germany ....... 2839714

[51] Int. Cl.³ .................................................. C08J 9/22
[52] U.S. Cl. ........................................ 521/57; 521/94
[58] Field of Search .................................... 521/57, 94

[56] References Cited

U.S. PATENT DOCUMENTS 2,956,960  10/1960  Nemphos .............................. 521/94

*Primary Examiner*—Morton Foelak
*Attorney, Agent, or Firm*—Gilbert L. Wells

[57] ABSTRACT

Small particulate expandable styrene polymer molding compositions are prevented from acquiring static charges by coating with betaines.

8 Claims, No Drawings

SMALL PARTICULATE EXPANDABLE STYRENE POLYMER MOLDING COMPOSITIONS

CROSS-REFERENCE TO RELATED APPLICATION

Applicants claim priority under 35 USC 119 for application P 28 39 714.0-43, filed Sept. 13, 1978 in the Patent Office of the Federal Republic of Germany.

BACKGROUND OF THE INVENTION

The field of the invention is pore-forming synthetic resins from foamed or foamable beads. The invention is particularly concerned with fine particle expandable styrene polymers having the surface of the particles coated with betaines.

The state of the art of foamed polystyrene may be ascertained by reference to the Kirk-Othmer, "Encyclopedia of Chemical Technology," 2nd Edition, Vol. 9 (1966) under the section entitled "Foamed Plastics," pages 847-844 and Vol. 19 (1969) under the section entitled "Styrene Plastics," pages 85–134, particularly pages 116–120 where polystyrene foams are disclosed, and U.S. Pat. Nos. 3,389,097; 3,503,905; 3,682,844; 3,789,028; 3,972,843 and 4,020,022, the disclosures of which are incorporated herein.

Betaines are disclosed in Kirk-Othmer, ibid. Vol. 5 (1964) p. 405 and Vol. 6 (1965) page 592, USSR Pat. No. 339,556, as reported at Chemical Abstracts Vol. 77, page 102670a and Japanese Pat. No. 56411 (1976), as reported at Chemical Abstracts Vol. 85, page 159449e, the disclosures of which are incorporated herein.

Small particulate expandable styrene polymer based molding compositions are advantageously obtained by suspension polymerization of the monomer in the presence of gaseous or liquid blowing agents. The suspension polymers containing the blowing agents are obtained in the form of beads with diameters between 0.1 and 4 mm. Beads of a very specific range in size are required when foams are made for the various applications. Thus, beads of small diameter are used to make thin-walled foams, while beads of larger diameters are used for insulating foam blocks.

Beads of a specific size are obtained by sifting production runs. This is conventionally done so that the beads separated from the aqueous phase are washed and dried and then placed on moving screens. Problems are encountered with strong electrical charges generated by the motion and the mutual friction of the beads on the screen. This seriously hampers sifting because the smaller beads cling like grapes to the larger ones and therefore fail to come in contact with the sifting area. Agglomerated particles may clog the screen meshes, whereby the sifting effectiveness is reduced.

The expandable molding compositions are processed according to the state of the art first by being prefoamed by heating in water or steam and then being foamed further in molds and thus sintered into molded bodies. A substantial proportion of fine particles, that is, the proportion of beads with diameters less than 0.1 mm will particularly interfere in the individual fractions because the steam intake nozzles of the processing equipment are clogged by these fine beads. Following drying and intermediary storage, the pre-foamed molding materials are pneumatically conveyed to the final foaming equipment. Here again, electrostatic charging takes place, agglomerates are formed and line clogging occurs in the conveyance which interferes with the regular procedure.

Accordingly, there have been many attempts in the past to improve the sifting by means of additives (sifting accessories).

Australian Pat. No. 66/5068 and French Pat. No. 1,478,998 describe the addition of a quaternary ammonium compound. These coatings are found to be impractical because the amines arising from the inevitable dissociation reaction of the quaternary ammonium compounds result in odor pollution in processing and application. Furthermore, quaternary ammonium compounds may be physiologically objectionable and may cause eczema.

West German Published Application 16 69 746 discloses coating fine particulate, expandable molding compositions containing a styrene polymer and a blowing agent with a sulfonium salt of which the cation comprises a hydrocarbon group with 6 to 24 carbon atoms. Such substances very substantially lower the boundary surface tension of styrene and water, which is particularly adverse where the sifted fine particulate proportion will be used again dissolved in styrene in the next polymerization batch. Because of the large surface of the proportion of the fine particles, the subsequent attempt at polymerization is supplied with non-negligible amounts of the boundary-surface active substance, and the suspension polymerization is interfered with. The boundary-surface active substance cannot be separated from the proportion of fine particles even after multiple rinsing, so that this proportion cannot be made use of in further inputs.

German Published Application 26 25 389 discloses a process for improved grading, where the expandable beads obtained after polymerization are treated with an aqueous solution of a hygroscopic metallic salt. This method suffers from the drawback that the metal salts used cause strong corrosion in metal surfaces, and therefore this method cannot be used over extended periods of time without damaging the production equipment.

SUMMARY OF THE INVENTION

Having in mind the limitations of the prior art it is an object of the present invention to prevent the build up of static charges on small particle expandable styrene polymers during processing.

According to the present invention, the particles of the molding compositions are coated with betaines of the general formula

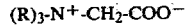

$$(R)_3\text{-}N^+\text{-}CH_2\text{-}COO^-$$

where R represents similar or different hydrocarbon groups having 1 to 4 C atoms.

DESCRIPTION OF THE PREFERRED EMBODIMENTS

The styrene polymers contained in the fine particulate expandable molding compositions are defined as polystyrene and styrene copolymers into which at least 50% of styrene has been polymerized. The following are used for instance as comonomers for styrene: alpha methylstyrene, nuclear halogenated styrene, nuclear alkylated styrene, acrylonitrile, maleic acid anhydride, butadiene, divinylbenzene and butanedioldiacrylate.

The molding compositions contain liquid or gaseous organic compounds acting as blowing agents, which do not dissolve the polymer and of which the boiling point is below the softening point of the polymer, for instance, aliphatic or cycloaliphatic hydrocarbons such as propane, butane, pentane, hexane, heptane, cyclohexane or halogen hydrocarbons such as methylene chloride, dichlorodifluoro methane and trifluorochloromethane. Again, mixtures of the blowing agents may be contained in these materials. Advantageously, a concentration of from 3 to 10% by weight referred to the styrene polymer is used for the blowing agents. The compositions can furthermore contain other additives such as flame protectants, lubricants and softeners.

The coating agents used according to the present invention are betaines of the general structural formula

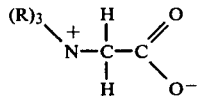

wherein R represents similar or different hydrocarbon groups having 1 to 4 C atoms, in particular, alkyl groups having 1 to 4 C atoms. The compound wherein R=(CH$_3$)$_3$-(glycocoll betaine) is especially preferred. The betaines are used in proportions of 0.001 to 1% by weight referred to the molding compositions, preferably between 0.01 and 0.1% by weight.

Other specific examples of the betaines of the general formula include N-Ethylglycocollbetaine, N,N-diethylglycocollbetaine, N,N,N-triethylglycocollbetaine, N-propylglycocollbetaine, N-butyl-glycocollbetaine, N,N-propylethylglycocollbetaine.

The betaines of the present invention do not split off amines under the conditions of operation. They are unobjectionable physiologically and are easily available, being side products in sugar making, and hence are also economical. The betaines are also available by reacting the corresponding amines with monochloroacetic acid. Betaines with hydrocarbon groups comprising from 1 to 4 C atoms are not boundary surface active, that is, they show no effect on the boundary surface tension between styrene and water. Therefore, the sifted proportion of fine particles can be used in successive inputs without adversely affecting the stability of the suspension as a repeat solvent.

The surface of the particles of the molding material most appropriately is coated with aqueous or alcoholic betaine solutions. The coating process is carried out in the course of processing, for instance, by adding the betaine solution during the drying procedure. Again, it is possible to spray solutions onto the particles of these materials prior to sifting and to evaporate the solvents.

EXAMPLE 1

A batch of expandable polystyrene particles containing 200 kg of beads per 200 kg of aqueous phase, obtained by suspension polymerization and cooled to 35° C., is separated in a vacuum filter from the aqueous phase. Various amounts of glycocoll betaine are atomized as a 2% solution in a mixer on the moist beads. Then drying takes place in a through dryer at room temperature, and thereupon sifting takes place.

The level of the fine particulate proportion is tested in the individual fractions after pre-foaming the crude beads. To that end, 100 g of pre-foamed composition are put into a glass cylinder of which the upper end is covered by a tight-mesh sieve. An air flow is made to pass for 10 minutes through the glass cylinder. The air flow carries with the proportion of fine particles through the sieve out of the cylinder, where said proportion is collected and weighed.

| Table for Example 1 | | | | |
|---|---|---|---|---|
| Amount of Betaine % by wt | % by wt of fine particles in the sieve fractions | | sifting action | charging (electro-static) |
| | 0.5 to 1 mm | 1 to 2 mm | | |
| — | 0.250 | 0.195 | poor | strong |
| 0.005 | 0.009 | 0.008 | good | moderate |
| 0.07 | 0.002 | 0.002 | good | good |
| 0.02 | 0.001 | 0.001 | good | good |

EXAMPLE 2

A batch of expandable polystyrene particles containing 1 ton of beads for 1 ton of water, prepared by suspension polymerization and cooled to 35° C., is separated from the aqueous phase by centrifugal filtering, rid of external and internal humidity in a multi-stage dryer, pneumatically conveyed to the sifting equipment and there graded into the grain fractions corresponding to commercial types. The glycocoll betaine sifting additive is added as a 2% aqueous solution during the drying process. The testing is the same as in Example 1.

| Table for Example 2 | | | | |
|---|---|---|---|---|
| % by wt of betaine | % by wt of fine particles in the sieve fractions | | sifting | charging (eletro-static)* |
| | 0.5 to 1 mm | 1 to 2 mm | | |
| 0 | 0.1423 | 0.0124 | poor | high |
| 0.01 | 0.0080 | 0.0024 | good | good |
| 0.02 | 0.0075 | 0.0010 | good | good |

We claim:

1. In a process for the preparation of shaped bodies based on expanded styrene polymers comprising: the polymerization with the addition of an expanding agent of styrene or a mixture thereof with at least one monomer copolymerizable therewith and forming expandable styrene particles each having a continuous surface, preforming of the resulting expandable particles, aging of the preformed particles, and molding thereof in a pressure resistant mold, the improvement comprising: coating with aqueous or alcoholic solution said surface prior to preforming with a continuous coating of betaines having the general formula $$(R)_3\text{-N}^+\text{-CH}_2\text{COO}^-$$

where R represents the same or different hydrocarbon groups having 1 to 4 carbon atoms to prevent build up of static charges on said surface.

2. The process of claim 1, wherein said betaines are about 0.001 to 1 percent by weight based on the weight of said expandable styrene particles.

3. The process of claim 2, wherein said betaines are 0.01 to 0.1 percent by weight.

4. The process of claim 3, wherein said betaines are selected from the grup consisting of N-ethylglycocollbetaine, N,N-diethylglycocollbetaine, N,N,N-triethylglycocollbetaine, N-propylglycocollbetaine, N-butylglycocollbetaine, and N,N-propylethylglycocollbetaine.

5. The particulate molding composition of claim 1 wherein said betaines include glycocollbetaines.

6. A process for the preparation of shaped bodies based on expanded styrene polymers comprising:
(a) polymerizing styrene or a mixture thereof with at least one monomer copolymerizable therewith and with the addition of an expanding agent to form expandable styrene particles each having a continuous surface;
(b) coating with aqueous or alcoholic solution said surface with a 0.001 to 1 percent by weight of a continuous coating of betaines having the general formula $$(R)_3\text{-}N^+\text{-}CH_2\text{-}COO^-$$

where R represents the same or different hydrocarbon groups having 1 to 4 C atoms, to prevent built up of static charges on said surface;
(c) sifting said expandable styrene particles each having a betaine coated surface;
(d) preforming said sifted expandable styrene particles; and
(e) molding said preformed expandable styrene particles in a pressure resistant mold.

7. The process of claim 6, wherein said expandable styrene particles each have a diameter of about 0.1 to 4 mm.

8. The process of claim 6, wherein said solutions have a betaine concentration of about 2%.